United States Patent Office 3,268,475
Patented August 23, 1966

3,268,475
PROCESS FOR THE STABILIZATION OF POLY-BUTADIENE - HEXAHALOCYCLOPENTADI-ENE RESINS
Paul E. Hoch, Youngstown, and George B. Stratton, Lewiston, N.Y., assignors to Hooker Chemical Corporation, Niagara Falls, N.Y., a corporation of New York
No Drawing. Filed Aug. 13, 1962, Ser. No. 216,293
10 Claims. (Cl. 260—45.9)

This invention relates to an improved process for producing highly halogenated polymer products. More particularly, the invention relates to a method for improving the reaction of rubbery polymers with a polyhalogenated cyclopentadiene to provide a product of controlled molecular weight.

It is known that dienes such as hexahalocyclopentadiene will react with unsaturated butadiene polymers by adding across the double bonds of the polymer molecule. But is has not been heretofore possible to produce commercially usable products when incorporating large amounts of hexahalocyclopentadiene because of the degradation of the polymer products that occurs especially when using certain types of butadiene polymers.

Accordingly, it is an object of this invention to provide a novel process for reacting diene rubbery polymers with a polyhalogenated cyclopentadiene to produce commercially valuable thermoplastic polymer products. It is another object of the invention to provide a method of controlling the molecular weight of the reaction product of a rubbery butadiene polymer with a polyhalogenated cyclopentadiene. It is still another object of the invention to provide a method for inhibiting the degradation of a rubbery butadiene polymer during the reaction of the polyhalogenated cyclopentadiene with the polymer. These and other objects of the invention will become more apparent from a consideration of the following detailed specification.

In accordance with this invention, there is provided a process which comprises reacting an unsaturated polymer of butadiene with a polyhalogenated cyclopentadiene having the formula:

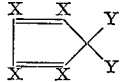

wherein X is selected from the group consisting of fluorine, chlorine and bromine, and Y is selected from the group consisting of fluorine chlorine, bromine and an alkoxy radical, in the presence of a stabilizer that controls the molecular weight of the resulting polymer product. The stabilizers of the invention are compounds of the classes: nitro-substituted aromatic hydrocarbons, phenols, and alkyl-substituted phenols.

Examples of the nitro-substituted aromatic hydrocarbons that can be used are nitrobenzene, ortho-, meta-, and para-dinitrobenzenes, trinitrobenzene, and 2,4-dinitrophenol, as well as more complex compounds such as 2,2'-diphenyl-1-picrylhydrazine. Typical of the phenols are phenol, hydroquinone, catechol, resorcinol, and phloroglucinol, as well as the quinone forms that exist, such as ortho- and parabenzoquinone. Examples of the alkyl-substituted phenols are meta- and para-isopropyl phenol; 3,5-dimethylphenol; 3,5-diethylphenol; 3,5-sec-butylphenol; 3-ethyl-5-isopropylphenol; 2-methyl-4-isopropylphenol; 3,5-dicyclohexylphenol; 2,4,6-trimethylphenol; tertiary butyl catechol; para-cresol; 5-isopropyl resorcinol; 4-n-propyl resorcinol; 4-n-nonyl resorcinol; 4-n-hexyl resorcinol; and toluhydroquinone. Generally the alkyl substituents can have carbon chains of up to ten carbon atoms.

Polymers of butadiene that can be reacted with polyhalogenated cyclopentadienes are the various polybutadienes prepared by mass, solution or emulsion polymerization techniques, butadiene-styrene copolymers (the well known SBR type rubber), and the like.

Copending application SN 216,288, filed on even date herewith, described a highly halogenated product of at least 0.6 mole of a polyhalogenated cyclopentadiene per mole of butadiene in a butadiene rubber which contains at least 80 percent cis 1,4-configuration, and preferably at least 90 percent. These are the preferred polymers for use in the invention. A process for producing a polybutadiene rubber having such a high cis 1,4-content is disclosed in U.S. Patent No. 3,004,018. Briefly, the process comprises reacting a rubbery polymer of 1,3-butadiene in the presence of a catalyst composition comprising titanium tetraiodide and an organo metal compound such as dimethyl mercury, diethyl mercury, dibutyl mercury, dimethyl zinc, dibutyl zinc, dihexyl zinc and the like. The reaction is carried out at a temperature in the range of —80 to 150 degrees centigrade in the presence of a hydrocarbon diluent such as toluene. At the completion of the polymerization reaction, the catalyst is deactivated and the polymer is precipitated from the solution.

Typical polyhalogenated cyclopentadienes that can be used in the reaction are hexachlorocyclopentadiene, hexabromocyclopentadiene, 5,5-dibromotetrachlorocyclopentadiene, 5,5-difluorotetrachlorocyclopentadiene, 5,5-dimethoxytetrachlorocyclopentadiene, 5,5 - diethoxytetrachlorocyclopentadiene and the like. Generally, the alkoxy radicals have one or two carbon atoms but higher carbon chains are contemplated.

In the process of the instant invention, it is preferred to utilize in the reaction mixture at least about 5 parts of polyhalogenated cyclopentadiene per part of rubber. The use of this ratio insures that sufficient halocyclopentadiene is available to obtain the desired reaction product in a reasonable length of time. However, lower ratios, such as three to four parts of halogenated cyclopentadiene can be used per part of rubber, but long reaction time is required. Much larger quantities of halocyclopentadiene can be utilized, e.g. up to 100 parts of halocyclopentadiene per part of rubber and higher. In fact, it is convenient to use the halocyclopentadienes as the diluent in the reaction mixture to reduce viscosity of the reaction mixture and to avoid the use of an extraneous diluent in the reaction system. However, other diluents that are not deleterious to the reaction can be used. Suitable diluents for this purpose are as follows: the aliphatic, cycloaliphatic and aromatic hydrocarbons such as hexane, isooctane, normal decane, benzene, toluene, xylene, cyclohexane, methylcyclohexane and the like; chlorinated hydrocarbons such as chloroform, trichloroethylene, dichloropropane, tetrachloroethane propylene dibromide, trichlorobenzene, benzotrichloride, the chloro toluenes and the like; ketones such as diethylketone, methylpropylketone, mesityl oxide and the like; esters such as isobutyl acetate, amyl acetate, butyl propionate, ethyl butyrate and the like. Mixtures of the various solvents can also be used. The aromatic hydrocarbons are the preferred diluents. It is generally preferred that the boiling point of the diluent not exceed about 200 degrees centigrade to facilitate removal from the unreacted halocyclopentadiene. The ratio of solvent used in the reaction mixture generally does not exceed about 100 parts per part of rubber reacted.

The reaction of this invention proceeds best at elevated temperatures, preferably in the range of 100 to 170 degrees centigrade. However, higher and lower temperatures can be used, e.g., in the range of 70 to 200 degrees centigrade. It is generally convenient to conduct the reaction at atmospheric pressure, although, depending on the use of particular diluents and reaction temperatures, it is sometimes convenient to carry out the reaction at super atmospheric pressure or under vacuum.

During the course of the reaction, some halogen halide may be prodused. The color of the resulting product can be improved by continuously absorbing the halogen halide as it is produced This can be conveniently done by including the scavenger such as an epihalohydrin or other epoxide compounds in the reaction zone. The scavenver is usually included in the reaction mixture in an amount varying from 0.01 to 25 percent based on the weight of butadiene rubber.

The stabilizers of the instant invention are utilized in the reaction mixture to an extent depending on the degree of stabilization of the reaction product that is desired. In order to obtain the maximum stabilization possible, that is, to inhibit the degradation of the polymer to the greatest extent, the stabilizer should be used in an amount up to about 5 percent based on the weight of the rubbery butadiene polymer reacted. It is within the scope of the invention to utilize various amounts of stabilizers down to a value of about 0.01 percent based on the weight of rubbery butadiene polymer present in the reaction mixture. The results that can be obtained by the utilization of various amounts of stabilizer will become more apparent by a consideration of the following detailed examples which are intended to illustrate the invention, but not to limit the scope of the invention. In these examples, the intrinsic viscosities were obtained in toluene at 30 degrees centigrade.

Examples 1 to 5 show the effect of using dinitrobenzene on the intrinsic viscosity of the polymer products. In this series of runs, the stabilizer was added at progressively later stages of the five hour reaction period until in Example 5 no stabilizer was added.

*Example 1*

75 grams of "Cis-4" polybutadiene rubber having a cis-1.4 content of about 95 percent and an intrinsic viscosity of 2.15 dl./g. and 900 grams of hexachlorocyclopentadiene that had been treated with magnesium oxide for removel of impurities, were introduced into a reactor together with 15 cc. of epichlorohydrin With the reactor under nitrogen atmosphere, the reactor contents were heated at about 100 degrees centigrade to dissolve the rubber. Thereafter, 0.1 gram meta-dinitrobenzene was added to the reactor, and the reaction was carried out for 5 hours with agitation at 150 degrees centigrade. The contents were discharged from the reactor with 990 cc. xylene. Then 100 grams of the resulting polymer solution was mixed with 75 grams of water and about 25 grams Triton X–100 ethoxylated alkylphenol emulsifying agent in a blender at 25 to 38 degrees centigrade. The resulting dispersion was poured into 500 cc. of normal amyl alcohol, while maintaining good agitation of the mixture. The resulting white, powdered polymer was centrifuged from the dispersion, washed with normal amyl alcohol, and then with isopropyl alcohol, and then dried in a vacuum oven for about 8 hours at 140 degrees centigrade and 3 mm. pressure. The polymer product had a chlorine content of 58.2 weight percent, and an intrinsic viscosity of 0.79 dl./g.

*Example 2*

75 grams of "Cis-4" polybutadiene rubber having a cis-1,4 content of about 95 percent and 900 grams of hexachlorocyclopentadiene that had been treated with magnesium oxide, were introduced into a reactor together with 15 cc. of epichlorohydrin. With the reactor open to the atmosphere, the reactor contents were heated for 3 hours at 110 degrees centigrade to dissolve the rubber, and then for 1 hour at 150 degrees centigrade. Thereafter, 01 gram meta-dinitrobenzene was added to the reactor, which was then flushed with nitrogen gas The reaction was continued for 4 hours with agitation at 150 degrees centigrade. Then 100 grams of the resulting polymer solution was mixed with 100 grams of water and about 5 cc. Triton X–100 emulsifying agent in a blender at 25 to 38 degrees centigrade. The resulting dispersion was poured into 400 cc. of normal amyl alcohol, while maintaining good agitation of the mixture. The resulting white, powdered polymer was centrifuged from the dispersion, washed with normal amyl alcohol, and then with isopropyl alcohol, and then dried in a vacuum oven for about 8 hours at 140 degrees centigrade and 3 mm. pressure. The polymer product had a chlorine content of 59.5 weight percent, and an intrinsic viscosity of 0.459 dl./g.

*Example 3*

75 grams of "Cis-4" polybutadiene rubber having a cis-1,4 content of about 95 percent, 900 grams of magnesium oxide-treated hexachlorocyclopentadiene, and 15 cc. of epichlorohydrin, were heated in an open reactor for 2½ hours at 110 degrees centigrade, and, thereafter, at 150 degrees centigrade for 2 hours. Then, 0.1 gram of meta-dinitrobenzene was introduced into the reactor which was then flushed with nitrogen gas. The reaction was continued for 3 hours at 150 degrees centigrade. The product was recovered from the reactor product in the same manner as in Example 1, and found to have a chlorine content of 59.2 percent and an intrinsic viscosity of 0.463 dl./g.

*Example 4*

75 grams of "Cis-4" polybutadiene rubber having about 95 percent cis-1,4 configuration, 900 grams of magnesium oxide-treated hexachloropentadiene and 15 cc. epichlorohydrin, were heated in an open reactor at 110 degrees centigrade for 2.25 hours, and, thereafter, for 3 hours at 150 degrees centigrade. Then, 0.1 gram of meta-dinitrobenzene was added to the reactor which was flushed with nitrogen gas. The reaction was continued for an additional 2 hours at 150 degrees centigrade. The product that was recovered from the reaction mixture was found to have a chlorine content of 59.4 percent, and an intrinsic viscosity of 0.345 dl./g.

*Example 5*

75 grams of "Cis-4" polybutadiene rubber having about 95 percent cis-1,4, configuration, 900 grams of magnesium oxide-treated hexachlorocyclopentadiene and 15 cc. of epichlorohydrin, were heated in an open reactor at 90–100 degrees centigrade for 4 hours until all the rubber was in solution. Then the temperature was raised to 150 degrees centigrade for 5 hours. The product was recovered using the procedure of Example 1, and found to have a chlorine content of 58.4 weight percent and an intrinsic viscosity of 0.320 dl./g.

The following table summarizes the effect or intrinsic viscosity of adding meta-dinitrobenzene (DNB) at various stages of the five hour reaction periods of Examples 1 to 4.

| | Example Number | | | | |
|---|---|---|---|---|---|
| | 1 | 2 | 3 | 4 | 5 |
| Hours at 150° C. with DNB present | 5 | 4 | 3 | 2 | 0 |
| Intrinsic Viscosity dl/g | 0.79 | 0.459 | 0.463 | 0.345 | 0.320 |

These results show that as the stabilizer was maintained in the reaction system for progressively shorter periods, the molecular weight of the product decreased, as indicated by intrinsic viscosity. Similar results are obtained by varying the quantity of stabilizer used.

Example 6

This example shows the use of hydroquinone as a stabilizer.

75 grams of "Cis-4" polybutadiene rubber having a cis-1,4 content of 95 percent and 900 grams of hexachlorocyclopentadiene that had been treated with magnesium oxide for removal of impurities, were introduced into a reactor together with 15 cc. epichlorophydrin. With the reactor open to the atmosphere, the reactor contents were heated for 4 hours at 90 degrees centigrade to dissolve the rubber, and then for 2 hours at 150 degrees centigrade. Thereafter, 0.2 gram hydroquinone was added to the reactor, which was then flushed with nitrogen gas. The reaction was continued for 3 hours with agitation at 150 degrees centigrade. 200 grams of the resulting polymer solution was mixed with 100 grams water and 5 cc. Triton X–100 emulsifying agent in a blender at 25 to 38 degrees centigrade. The resulting dispersion was poured into 500 cc. of normal amyl alcohol, while maintaining good agitation of the mixture. The resulting white powdered polymer was centrifuged from the dispersion, washed with normal amyl alcohol, and then with isopropyl alcohol, and dried in a vacuum oven for 4 to 6 hours at 140 degrees centigrade/3 mm. The polymer product had a chlorine content of 59.0 weight percent, and an intrinsic viscosity of 0.3943.

Example 7

This example shows the use of tertiary butyl catechol as a stabilizer.

75 grams of "Cis-4" polybutadiene rubber having a cis-1,4 content of 95 percent and 900 grams of hexachlorocyclopentadiene that had been treated with magnesium oxide, were introduced into a reactor together with 15 cc. epichlorohydrin. With the reactor open to the atmosphere, the reactor contents were heated for 7 hours at 95 degrees centigrade to 100 degrees centigrade to dissolve the rubber, and then for 2 hours at 150 degrees centigrade. Thereafter, 0.2 gram tertiary butyl catechol was added to the reactor, which was then flushed with nitrogen gas. The reaction was continued for 3 hours with agitation at 150 degrees centigrade. 200 grams of the resulting polymer solution was mixed with 100 grams water and 5 cc. Triton X–100 emulsifying agent in a blender at 25 to 38 degrees centigrade. The resulting dispersion was poured into 500 cc. of normal amyl alcohol, while maintaining good agitation of the mixture. The resulting white powdered polymer was centrifuged from the dispersion, washed with normal amyl alcohol and then with isopropyl alcohol, and then dried in a vacuum oven for 4 to 6 hours at 140 degrees centigrade/3 mm. The polymer product had a chlorine content of 58.7 weight percent, and an intrinsic viscosity of 0.3979.

The following Examples 8 and 9 show the effect of using dinitrobenzene on the reaction of hexachlorocyclopentadiene and SBR rubber.

Example 8

75 grams of an emulsion polymerized styrene-butadiene rubber, 900 grams of hexachlorocyclopentadiene and 15 grams of epichlorohydrin were heated in air for 5 hours at 105 degrees centigrade, and then for 5 hours at 150 degrees centigrade. No stabilizer was used. The reaction product was very dark amber in color, and treatment with alcohol to precipitate the polymer yielded only a small amount of a low molecular weight gum.

Example 9

Example 8 was repeated except that the reaction was carried out under a nitrogen atmosphere and 0.1 gram of meta-dinitrobenzene was added to the reaction mixture in an attempt to prevent degradation of the polymer product. A gummy solid product was precipitated from the reaction mixture with isopropyl alcohol, was redissolved in xylene and reprecipitated. After vacuum drying, the product was a gummy solid having a chlorine content of 34.7 weight percent.

Example 10

This example shows the use of dinitrobenzene in the reaction of tetrachloro-dimethoxycyclopentadiene and polybutadiene.

Fifteen grams of polybutadiene rubber having a cis-1,4 content of about 95 percent, and 180 grams of 1,2,3,4-tetrachloro-5,5-dimethoxycyclopentadiene, were heated at 100 degrees centigrade for one hour to dissolve the rubber and then the temperature was raised to 150 degrees centigrade for two hours. Thereafter, 0.1 gram meta-dinitrobenzene was added to the reactor and heating continued for three hours at 150 degrees centigrade. The polymer product was precipitated from solution and had a chlorine content of about 40 percent.

Example 11

To show the different results that can be obtained using polymer products having different intrinsic viscosities, products produced in accordance with Examples 2 and 4 were dissolved in xylene to provide 20 percent solution. The solutions were coated on surfaces to provide films. The properties of the solutions and films were compared to those of a commercial chlorinated rubber product and found to be as follows:

| Property | Polymer of Ex. 2 | Polymer of Ex. 4 | Commercial Chlorinated Rubber |
|---|---|---|---|
| Viscosity of Solution #4 Ford, sec. | 400 | 16.5 | 12. |
| Drying characteristics | Excellent | Excellent | Good. |
| Elongation of film, percent | 30.4 | 9.4 | 0. |
| Hardness: | | | |
| Pencil | H-1 | 1-H | B. |
| Rocker | 40 | 40 | 70. |
| Impact strength on steel, lb./sq. in.: | | | |
| Direct | 12 | 12 | Failed. |
| Reverse | 25 | 25 | Failed. |
| Adhesion: | | | |
| Polished steel | Poor | Poor | Poor. |
| Rough steel | Good | Good | Fair. |
| Galvanized iron | Excellent | | Good. |
| Aluminum | Fair | | Good. |
| Brass | Excellent | | Good. |

The following example shows the use of the products of the invention in preparing coatings.

Example 12

Polymer product prepared in accordance with Example 2 was dissolved in the following mixture of solvents:

| | Parts |
|---|---|
| Polymer product of Ex. 2 | 800 |
| "Amsco D" solvent, an aromatic hydrocarbon blend having a specific gravity at 60° F. of 0.86, a boiling range of 329–379° F. and an aromatic equivalent of 74% | 1200 |
| VM & P naphtha | 100 |
| Mineral spirits | 100 |
| Xylene | 300 |

This solution was added to the following mixture of components which had been pebble-milled for 30 hours:

| | |
|---|---|
| Polymer product of Ex. 2 | 100 |
| TiO$_2$ (non-chalking) | 800 |
| Asbestine 425, finely micronized talc | 100 |
| Lecithin | 5 |
| Dioctyl phthalate | 200 |
| Bentone 27, laminated bentonite (prewet with n-butanol) | 15 |
| Colloidal silica | 5 |
| Co (6%) naphthanate | 3 |
| Pb (24%) naphthanate | 8 |
| "Amsco D" solvent | 500 |

The resulting coating composition had the following characteristics:

| | |
|---|---|
| Brushing characteristics | Good. |
| Weight per gallon | 9.82. |
| Non-volatiles, percent | 49.6. |
| Viscosity, c.p.s. Brookfield at 30 r.p.m. | 1760. |
| Fineness of grind, Hegman | 6½. |
| Adhesion: | |
| Knife cut on steel | Good. |
| Knife cut on galv. iron | Good. |
| Gloss | Semi-gloss. |
| Mandrel flexibility | Pass ⅛". |
| Chemical resistance:[1] | |
| Distilled water | No effect. |
| 5% sodium hydroxide | Do. |
| 5% sulfuric acid | Do. |

[1] Determined by allowing a drop of reagent to lay for 24 hours on the surface of the paint coated on a steel panel.

*Example 13*

This example shows the use of the products of the invention as molding compounds.

Twelve grams of the product of Example 1 with an intrinsic viscosity of 0.79 was carefully blended with 0.12 gram of Ciba 502 epoxy resin (a bisphenol-epichlorohydrin condensate having an epoxide equivalent of 232–250 weight per epoxide and a viscosity of 2100–3600 centipoises at 25° C.), used as a stabilizer, and poured into a bar mold with sprues (standard size—½" x ⅛" x 5"). The temperature was raised from room temperature to 175° C. and the pressure was maintained at 20,000 p.s.i. on the platen. When the mold closed, cooling water was turned on to quench. This quench produces an ejection from the mold and a bar free of cavities and paralleling the mold size. The color of the bar was a transparent amber with a high gloss finish and slightly flexible. Barcol Hardness was 20–21 and the second order transition point was about 107° C.

The polymer products of this invention are soluble in solvents such as toluene, xylene, cyclohexanone, methylene chloride, trichloroethylene, ortho-dichlorobenzene, perchloroethylene, methyl-n-butyl ketone, turpentine, and n-butylacetate. The polymers are swollen by solvents such as VM & P naphtha, cyclohexane, 2-nitropropane, ethyl acetate, and methyl ethyl ketone.

The polymer products are compatible with materials such as 70% chlorinated paraffin, dioctyl phthalate, and commercial plasticizers such as butyl phthalyl butyl glycolate and chlorinated biphenyl.

As shown in the foregoing examples, polymer products can be produced in accordance with the invention having a wide variety of molecular weights. Generally, the intrinsic viscosity of the products is in the range of 0.2 to 1 dl./g., but higher and lower values can be obtained.

It is understood that the details provided in the foregoing specification can be modified by those skilled in the art without departing from the spirit and scope of the invention.

What is claimed is:

1. A process for producing a resinous reaction product which comprises reacting an unsaturated, rubbery polymer of butadiene with a polyhalogenated cyclopentadiene having the formula:

wherein X is selected from the group consisting of fluorine, chlorine and bromine, and Y is selected from the group consisting of fluorine, chlorine, bromine and an alkoxy radical; in the presence of about 0.01 to about 5 percent, based on the weight of the rubbery butadiene polymer, of a stabilizer compound that controls the molecular weight of the polymer product, and which is selected from the group consisting of nitro-substituted aromatic hydrocarbons, phenols, and alkyl-substituted phenols.

2. A process of claim 1 wherein the polyhalogenated cyclopentadiene is hexachlorocyclopentadiene.

3. The process of claim 1 wherein the polyhalogenated cyclopentadiene is 1,2,3,4-tetrachloro-5,5-dimethoxycyclopentadiene.

4. The process of claim 1 wherein the polymer of butadiene is a polybutadiene which contains at least 80 percent of cis 1,4-configuration.

5. The process of claim 1 wherein the stabilizer is meta-dinitrobenzene.

6. The process of claim 1 wherein the stabilizer is hydroquinone.

7. The process of claim 1 wherein the stabilizer is tertiary butyl catechol.

8. The process of claim 1 when carried out in the presence of a diluent that is the solvent for the reactants and polymer product.

9. The process of claim 8 wherein the diluent is hexachlorocyclopentadiene.

10. The process of claim 1 when carried out in the presence of epichlorohydrin.

References Cited by the Examiner

UNITED STATES PATENTS

| | | | |
|---|---|---|---|
| 1,950,438 | 3/1934 | Carothers et al. | 260—45.9 |
| 2,898,256 | 8/1959 | Robitschek | 260—860 |
| 3,004,018 | 10/1961 | Naylor | 260—94.3 |
| 3,006,888 | 10/1961 | Reynolds et al. | 260—45.95 |

FOREIGN PATENTS

| | | |
|---|---|---|
| 1,120,137 | 12/1961 | Germany. |
| 931,915 | 7/1963 | Great Britain. |

WILLIAM H. SHORT, *Primary Examiner.*

DONALD E. CZAJA, C. A. WENDEL,
*Assistant Examiners.*

UNITED STATES PATENT OFFICE
CERTIFICATE OF CORRECTION

Patent No. 3,268,475                      August 23, 1966

Paul E. Hoch et al.

It is hereby certified that error appears in the above numbered patent requiring correction and that the said Letters Patent should read as corrected below.

Column 1, line 20, for "But is" read -- But it --; column 3, line 9, for "prodused" read -- produced --; line 11, after "produced" insert a period; line 14, for "scavenver" read -- scavenger --; line 47, after "epichlorohydrin" insert a period; column 4, line 3, for "01" read -- 0.1 --; column 5, lines 37 and 42, for "centrigrade", each occurrence, read -- centigrade --..

Signed and sealed this 3rd day of June 1969.

(SEAL)
Attest:

Edward M. Fletcher, Jr.

Attesting Officer                                    Commissioner of Patents